Figure 1:
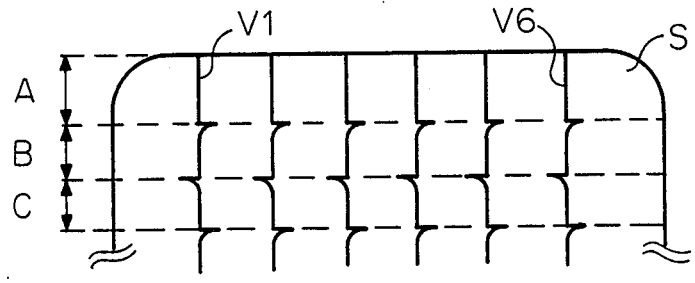

United States Patent [19]

Kaaden et al.

[11] Patent Number: 4,876,614
[45] Date of Patent: Oct. 24, 1989

[54] TRACK-READJUSTED MAGNETIC-TAPE RECORDER WITH TRANSVERSE TRACKING

[75] Inventors: Jürgen Kaaden, Pfaffenweiler; Hartmut Schandl, Villingen-Schwenningen, both of Fed. Rep. of Germany

[73] Assignee: Deutsche Thomson-Brandt GmbH, Villingen-Schwenningen, Fed. Rep. of Germany

[21] Appl. No.: 259,434

[22] Filed: Oct. 14, 1988

Related U.S. Application Data

[63] Continuation of Ser. No. 871,413, filed as PCT EP85/00460 on Sep. 12, 1985, published as WO86/02190 on Apr. 10, 1986, abandoned.

[30] Foreign Application Priority Data

Sep. 28, 1984 [DE] Fed. Rep. of Germany ....... 3435649

[51] Int. Cl.⁴ ............................................. H04N 5/783
[52] U.S. Cl. .................................................. 360/10.2
[58] Field of Search ..................... 360/10.1, 10.2, 10.3, 360/21, 70, 73, 75, 77, DIG. 1, 64, 107, 109, 71; 358/312

[56] References Cited

U.S. PATENT DOCUMENTS

| | | | |
|---|---|---|---|
| 2,897,290 | 7/1959 | Lyon | 360/70 |
| 2,979,558 | 4/1961 | Leyton | 360/70 |
| 3,697,676 | 10/1972 | Protas | 360/10.2 |
| 3,942,084 | 3/1976 | Louth | 318/138 |
| 4,004,205 | 1/1977 | Yamamoto | 360/70 |
| 4,120,007 | 10/1978 | Sato | 360/64 |
| 4,180,833 | 12/1979 | Nishikawa | 360/27 |
| 4,184,181 | 1/1980 | Mijatovic | 360/77 |
| 4,236,185 | 11/1980 | Obremski | 360/109 |
| 4,297,731 | 10/1981 | Melwisch | 360/75 |
| 4,338,631 | 7/1982 | Ota | 360/75 |
| 4,482,928 | 11/1984 | Moriya | 360/21 |

FOREIGN PATENT DOCUMENTS

| | | | |
|---|---|---|---|
| 1085688 | 7/1960 | Fed. Rep. of Germany | 360/70 |
| 3421183 | 12/1985 | Fed. Rep. of Germany | 360/109 |
| 2344924 | 10/1977 | France | 360/70 |
| 59-132449 | 7/1984 | Japan | 360/71 |
| 1574051 | 9/1980 | United Kingdom | 360/70 |

OTHER PUBLICATIONS

Grundig Technische Info. 3, pp. 111-130 ©1980.

Primary Examiner—Donald McElheny, Jr.
Attorney, Agent, or Firm—Max Fogiel

[57] ABSTRACT

A track readjustment arrangement for a video magnetic tape recorder in which at least two magnetic heads travel across the direction of motion of the magnetic tape, for the purpose of scanning signals that are recorded on the tape. The magnetic heads are carried on a rotatable head wheel, and they have air gaps with an azimuth angle that alternates mirror-inverted around the central axis of the wheel. The phase errors that may occur in the signals scanned by the magnetic heads are from the horizontal sync pulses. The magnetic heads provide individually control parameters that are derived from the magnitude and direction of the phase errors. The head wheel is axially varied and reset as a function of the control parameters.

18 Claims, 3 Drawing Sheets

TRACK-READJUSTED MAGNETIC-TAPE RECORDER WITH TRANSVERSE TRACKING

This application is a continuation of application Ser. No. 871,413, filed as PCT EP85/00460 on Sep. 12, 1985, published as WO86/02190 on Apr. 10, 1986, now abandoned.

The invention concerns track readjustment during playback in a magnetic-tape recorder with transverse tracking.

The tracks in tape recorders of the aforesaid type are preferably recorded and read by means of a wheel that has a magnetic head mounted on it and that rotates across the direction that the tape travels in. Magnetic tracks are recorded, in contrast to commercially available videorecorders, which operate on the helical-scan principle, approximately perpendicular to the edges of the tape. Whereas the contents of a total field can be stored in one helical track by known methods, VHS for example, the slenderness of the tape allows only a fraction of a field to be accommodated on one track in transverse tracking. Thus, several tracks must be recorded one after another to store a total field. Thus each individual head on the head wheel is responsible for one track, with a number of lines that depends on the particular mechanical characteristics of the recorder. In playback the field fractions are read out in sequence and combined into a single field in a connected television receiver. Various types of deviation, oscillations in the tape advance for example, can lead to phase errors during playback The phase errors cause malfunctions in synchronization in the receiver that express themselves as distortions of the vertical edges in the picture on the screen. Various types of circuits for eliminating such phase errors in existing transverse-tracking recorders, mainly of the professional type, are known. Thus, the played-back FBAS signal in Ampex transverse-tracking recorders travels through a voltage-controlled delay line or, in another version, switchover-capable delay lines that are controlled by processing either additionally recorded reference pulses or a color subcarrier functioning in the capacity of a reference signal. Although this does eliminate phase errors during playback, it does not result in precise track readjustment for the purpose of either optimum exploitation of the recorded signals or optimum crosstalk behavior.

Another method of eliminating phase errors is described in German Pat. No. 1 085 688. A drum with several heads is provided with a parallel auxiliary drum with only one recording head. Both drums rotate on the same shaft. The auxiliary drum is axially positioned far enough from the main drum to be located between two recorded transverse tracks. As it approaches a recorded transverse track during playback, the auxiliary head releases a pulse that accelerates the tape transport.

Another known method of track readjustment described in *Grundig Technische Informationen* 3, 3, pages 111–130 (1980) consists of varying the height of the head or heads in relation to the magnetic tape in response to control signals added to the tape during recording. The height is varied by means of piezoceramic plates tensioned into one side of the head drum and provided with freely pivoting tongues that the video heads are mounted on. When a control voltage is applied, the plates are mechanically disengaged to allow the magnetic heads to follow the recorded helical tracks.

The object of the invention is to provide a method of track readjustment for a magnetic-tape recorder with transverse tracking wherein the direction of the phase errors is detected for the individual magnetic heads during playback by means of horizontal sync pulses and/or other continuously recorded pulses and the position of the head wheel in relation to the recorded magnetic track readjusted therefrom. The result is not only optimum track readjustment with minimum crosstalk but also optimum phase correction.

The direction of the phase errors can in principle be detected from the azimuth angle of the magnetic heads on the head wheel. When, specifically, a track that has been recorded at a given azimuth angle is scanned at the exact midpoint of a magnetic head with the same azimuth angle, no phase deviations from a sequence of reference pulses will be detected with respect to sequences of pulses, horizontal pulses for example, that recur in the individual lines. When, however, the track is not precisely in the middle of the scanning head, there will be time lags and hence phase errors in comparison to the sequence of reference pulses. The phase errors will have different mathematical signs at an identical displacement of the spur in relation of the scanning magnetic head. The polarity results from the alternating mirror-inverted azimuth angles of the magnetic heads. In the first case, a magnetic head will scan the horizontal pulse later when the displacement is toward the previously recorded track and earlier when it is toward the next magnetic track, whereas the head will read the polarity of the phase deviations with a mirror-inverted azimuth angle for the next magnetic track at the same head displacement. It will accordingly be evident that, the more obtuse the azimuth angle of the magnetic heads, the longer the phase jumps, the chronological deviations in other words that occur during scanning next to the midpoint of the track. It is, however, also possible, when for example the individual magnetic heads have not been precisely adjusted, to intentionally read off next to the midpoint of the track in order to eliminate phase errors.

The extent and direction of the phase deviations are detected for every rotation of the individual magnetic heads in a detection circuit and supplied to a memory. The stored values are read out during the next rotation and supplied in the form of control voltages to an electromechanical converter to reset the head wheel individually for each head. The resetting occurs in the form of approximate adjustment to the particular recorded track, with the correction parameters, broken down into steps, newly emitted at each rotation of the head. Only when the phase errors become too slight to be detected inside a prescribed window does head resetting cease, and the head continues to be readjusted in accordance with the stored terminal value that corresponds to its deviation.

Another problem with recorders that feature transverse-track recording in which the contents of one field are recorded on several adjacent magnetic tracks is represented by the playback of still pictures. This problem as well can be solved by the readjustment of the head wheel in accordance with the invention in that, in addition to phase-error compensation by means of a ramp generator, the head wheel is displaced in recursive sequence over the magnetic tracks, which contain a field or frame, while the tape remains stationary.

In one preferred embodiment of the invention, tracks containing 25 television lines each are recorded on a magnetic tape 8 mm wide. The scanning rate is about 4 m a second. The number of magnetic heads is, depending on the wrapping angle, 2n=6 (60−80°) or 2N=8 for a wrapping angle of 45 to 60° as determined by convexity.

Figure 3:
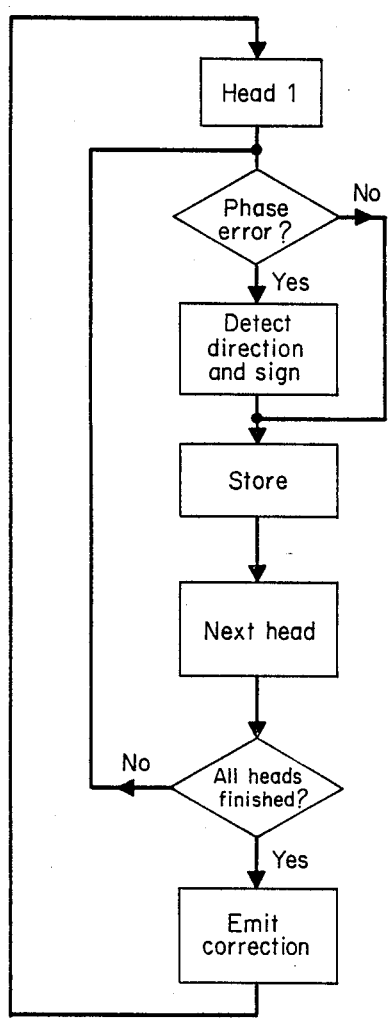
Figure 4:
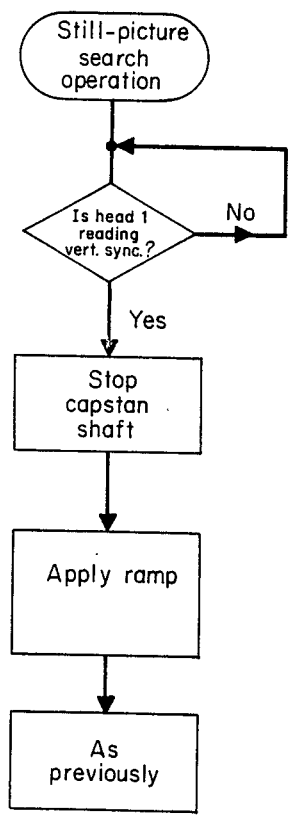
Figure 2:
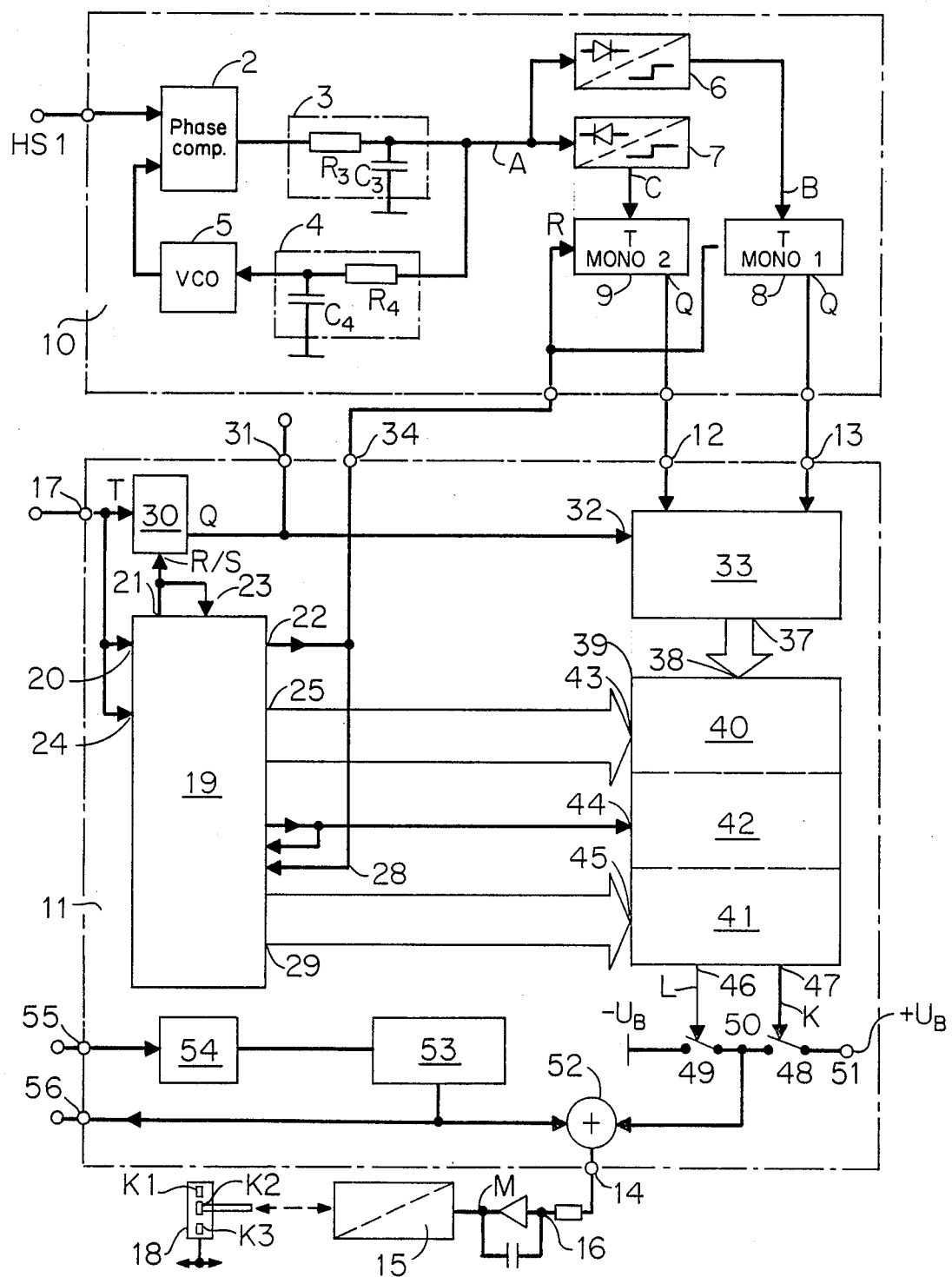

The invention will now be described with reference to one embodiment, which is illustrated in the drawings, of which FIG. 1 is an illustration of the type of distortion of vertical lines that occurs on the screen of a television receiver when track readjustment is incomplete, FIG. 2 is a block diagram of one possible embodiment of a track-readjustment circuit, FIGS. 3 and 4 are flow charts that illustrate how the device functions during normal playback, and in still-picture or search modes, and FIG. 5 (consisting of 5A–5H, 5K–5M) is a graph of the signal forms occurring at the inputs and outputs of different stages of the circuit illustrated in FIG. 2 as a function of time.

FIG. 1 illustrates the perceptible effect of phase errors at the transitions from one magnetic track to the next as the result of incomplete track readjustment. Synchronization errors are apparent on screen S at intervals of the 25 lines scanned by each head. The six vertical lines V1 to V6 are distorted in opposite directions. The direction of the phase errors and hence of the distortions results from the azimuth angle of the individual magnetic heads, which are mutually mirror-inverted.

The played-back signal is detected by head 1 in area A by head 2 in area B, and by head 3 in area C. The drawing is intended to show that the viewer cannot be guaranteed satisfactory video playback in transverse-track recorders without track readjustment.

FIG. 2 illustrates by way of example a block diagram of track readjustment in a transverse-track magnetic-tape recorder. The track is to be readjusted as described in German Pat. No. P 3 421 183.7 by moving the rotating head wheel 18 along its axis of rotation during playback. The displacement is carried out by an electromechanical converter 15 controlled by an electronic circuit consisting of the following major elements:

A detection circuit 10, in which the size and phase situation of pulses, horizontal sync pulses for example, that chronologically recur within one line are compared with a source of reference pulses. The information obtained in this circuit is supplied to the inputs 12 and 13 of a subsequent correction circuit 11, in which the detected phase errors are assigned in an incorrect-direction detection stage 33 to the individual magnetic heads. Correction circuit 11 also contains a memory system 39 with an input memory 40, a transfer stage 42, and an output memory 41. Buffer storage of the control data needed to reset the head wheel allows precise chronological matching between the output of control voltages and the particular position of rotating head wheel 18. The control voltages are supplied at the output 14 of correction circuit 11 to electromechanical converter 15 through an integration stage 16 to readjust head wheel 18. The function of the individual switching components illustrated in the block diagram will now be described.

The reconstituted horizontal sync pulses HS are supplied during playback to the input 1 of correction circuit 11, whence they arrive at one input of a phase-comparison stage 2. The output of phase-comparison stage 2 is connected to an RC deep-pass filter 3 with a comparatively low time constant T3 (R3×C3). The output of RC deep-pass filter 3 is connected on the one hand to the input of another RC deep-pass filter 4 with a high time constant T4 (R4×C4) and on the other to two polarity-separation stages 6 and 7. Stage 6 passes only pulses with a positive polarity and stage 7 only negative pulses. The output of second deep-pass filter 4 is connected to the frequency-control input of a voltage-controlled variable-frequency oscillator 5 (VCO). The output of voltage-controlled oscillator 5 is connected to the second input of phase-comparison stage 2. Phase-comparison stage 2, the cascaded deep-pass filters 3 and 4, and voltage-controlled oscillator 5 constitute a phase-locked loop (PLL) that generates an oscillator wave. The frequency of the wave is identical with the mean of the frequency of the played-back horizontal sync pulses HS.

Thus the output A of the first deep-pass filter or time element 3, which has a low time constant T3, provides pulsed information about short-term phase changes with a mathematical sign that corresponds to the direction of phase difference between the oscillator wave and the particular horizontal sync pulses arriving at any instant.

These pulses are supplied to the parallel inputs of two polarity-separation stages 6 and 7. The function of these stages is to process the incoming pulses in accordance with their signs, with one stage responding only to positive pulses and the other only to negative pulses. The outputs of polarity-separation stages 6 and 7 connect to the triggering inputs of two monostable flip-flop circuits 8 and 9, which act as pulse-forming stages. Since the phase deviations at their triggering inputs activate monostable flip-flop stages 8 and 9, they will emit rectangular pulses of equal polarity and a prescribed duration. This duration is essentially shorter than that of one track (1.6 msec). The outputs (Q) of monostable flip-flop stages 8 and 9 are connected to the inputs 12 and 13 of an incorrect-direction detection stage 33 in phase-correction circuit 11. Correction circuit 11 also has another input 17 that connects to the output of a pulse generator that is mechanically connected to the shaft of head wheel 18. The pulse generator can be electromagnetic or optico-electronic and designed to release a pulse whenever a fresh magnetic head comes into contact with the tape. Thus, it will supply six pulses to input 17 for every rotation of head wheel 18. The pulse must also correspond to that of the tape-contact situation of initial head K1, in such a way that the head can be identified due to the greater width of the pulse. This makes it possible to identify the other heads (K2–K6) as well and correctly assign their azimuth angles during storage of the phase errors in the sense of correct track readjustment. Thus, each memory contains the sign of the phase error previous to the termination of the rotation in relation to the head assigned to it. During the next rotation of head wheel 18, the stored data are released as correction signals and conveyed to converter 15. This occurs preferably about half a track duration (800 μsec) before the head with the axial position that is to be corrected comes into contact with the tape. Head wheel 18 is accordingly axially displaced during each rotation until the amplitude of the phase error is so small that the response or triggering threshold of monostable flip-flop stages 8 and 9 is not attained.

In order to assign the phase errors to the individual heads on the wheel, correction circuit 11 has a detector-counter 19. One input 20 of detector-counter 19 connects to pulse-generator input 17. The counter also has a decoding stage that for example decodes the width-coded pulse of initial head K1 and supplies a related pulse to an output 21. The detector-counter also supplies to another output 22 pulses that are delayed half a track duration (800 μsec) in relation to the pulses supplied by the pulse generator. Detector-counter 19 also has a ring-counter stage with a resetting input 23 and a counter-or-clock input 24. Resetting input 23 connects to output 21 and clock input to input 20. The initial ring-counter stage also has six initial parallel outputs 25 that are switched over to "high" one after another over one total track duration (1600 μsec). Detector-counter 19 also has another ring-counter stage with a resetting input 26 that is connected to another decoding output 27, which supplies resetting pulses half a track duration before the width-coded pulses. The ring-counter input 28 of the second ring-counter stage is supplied from second output 22 and has six other parallel outputs 29 that are switched to "high" one after another half a track duration before initial parallel outputs 25. Initial input 17, which is also connected to the pulse generator, also supplies the control-or-toggle input T of a bistable flip-flop switch 30. Since the setting input S of switch 30 is connected to initial decoding output 21 and/or its resetting input R to second decoding output 27, it can be synchronized to the correct phase situation at each rotation. The output Q of flip-flop switch 30 is connected on the one hand to a head-switchover output 31 and on the other to the input 32 of incorrect-direction detection stage 33. The signal at output Q is rectangular (a head-switchover signal) and its period is twice as long as one track duration (1600 μsec).

A high level H indicates the tape-to-head contact of an odd-numbered head (K1, K3, or K5) and a low level L the head contact of an even-numbered head (K2, K4, or K6) with a negative azimuth displacement (or vice versa).

Since the second output 22 of detector-counter 19, which supplies pulses delayed half a track duration, is connected to the resetting inputs R of monostable flip-flop stages 8 and 9 through output 34, outputs Q supply pulses of half a track length (800 μsec). Outputs Q connect to the inputs 12 and 13 of circuit 11 and to the inputs of incorrect-direction detection stage 33.

Thus, incorrect-direction detection stage 33 receives on the one hand pulses that correspond to the polarity of the phase jumps measured by the PLL and on the other, at input 32, the rectangular signal that corresponds to the azimuth angle of the head that is in contact with the band at that instant. These data can be correlated to determine the direction of track error. This means that circuit 33 can supply three different signals at its output 37. The first signal corresponds to track lag (negative error), the second to track parity (zero error), and the third to track advance (positive error). This can be expressed either by means of digital words with two binary digits (bits) or with a tri-state technology. The design can be embodied for instance in two inverters, four AND gates, and two OR gates combined similarly to integrated Model TTL 7451 double AND-OR-INVERT gates.

The outputs 37 of incorrect track-direction detection stage 33 are connected to the output 38 of a double memory system 39. Memory system 39 consists of an input memory 40, an output memory 41, and a controlled data-transfer stage 42. Since the address inputs 43 of input memory 40 connect to the first six parallel outputs 25 of detector-counter 19, the incorrect-direction data are entered one after another into the (2-bit) memory cells, which correspond to the number of heads (six in this case), of input memory 40. Data-transfer stage 42 briefly connects the data outputs of these memory cells to the data inputs of the corresponding number of memory cells in output memory 41. Thus, the data in input memory 40 are serially transferred to output memory 41. This transfer occurs by means of the resetting pulse of the second ring-counter stage at the decoding output 27 of detector-counter 19 and accordingly by means of the particular inverted signal at output 22. Output 27 is therefore connected to the input 44 of memory system 39.

Since the address inputs 45 of output memory 41 are connected to the six parallel outputs 29 from detector-counter 19, the data contents of all six memory cells will appear one after another at its two data outputs 46 and 47. Since these data contents are emitted delayed 5½ track durations in relation to the detection process, the correction process will occur half a track duration before the next detection process in relation to the same head. Thus, the result of this next detection process can take the correction result of the previous detection process of the same head into consideration. The data outputs 46 and 47 of output memory 41 are connected to control inputs of two series-connected electronic switches 48 and 49. Switch 48 connects midpoint 50 to a source 51 of positive voltage (+UB) and switch 49 connects midpoint 50 to −UB. The midpoint is also connected to one input of an analog addition stage 52. The other input of stage 52 connects to the output of a ramp-or-sawtooth generator 53. Generator 53 is employed for still-picture or search. The output from addition stage is connected to the input of integration stage 16 through a control output 14. Integration stage 16, which is switched over to the output of addition stage 52 performs the function of an analog memory, maintaining the pulse voltage emitted at the midpoint 50 of switches 48 and 49.

Ramp generator 53, which supplies sawtooth output signals, is activated and deactivated by a mode-selection stage 54. The input of stage 54 is connected to the input 55 of circuit 11. An mode-control signal that is either pulsed (in which case mode-selection stage 54 will include a bistable flip-flop switch) or binary, represented, that is, by two levels (H & L), is supplied to input 55.

During still-picture operation ramp generator 53 supplies electromechanical converter 15 with continuous sawtooth voltage through addition stage 52 and integration stage 16. The sawtooth voltage produces a chronologically linear motion of head drum 18 along the stationary magnetic tape. The linear motion of the head drum lasts for example slightly longer approximately than one field and accordingly comprises about 12 to 15 track durations. Limiting the displacement of the head to twelve tracks means that slightly less than one field will play back. Essential to still-picture playback is the presence of standardized frame-flyback sync signal in the signal. To ensure this, the magnetic tape is transported by the capstan drive until magnetic head K1 detects a frame-flyback sync signal on one track. Only then is the tape stopped. Another output 56 from ramp generator 53 blends the video signal while the head drum is flying back.

FIG. 3 is a flow diagram of the device illustrated in FIG. 2 during normal playback.

Track readjustment commences with head 1. Its contact with the tape is characterized by a broad pulse. Once head 1 has read off the first horizontal sync pulse, the pulse is compared with the oscillator-wave phase. Comparison determines whether a phase error exceeding a certain permissible limit is present. If so, one of the monostable flip-flop stages 8 or 9 releases a pulse that determines the direction, meaning the mathematical sign, of the detected phase error.

The size of the phase error now becomes unimportant because memory storage and correction are quantitative. Only a prescribed quantity of correction signals is added to the previous quantity and stored for each head during each head-rotation cycle. Once the direction has been determined, the prescribed quantity is stored as a unit along with its sign, and measurement proceeds to the next head. If there is no phase error for the first head K1, this state is stored. This is followed by phase-error detection for head 2. Now comes a poll as to whether all heads K1 to K6 have gone through the cycle. If not, phase-error detection is continued with subsequent sign-and-direction detection and the new values stored. This process is repeated until all six heads K1 to K6 have gone through the cycle. The stored correction dimensions are then supplied with their sign to electromechanical converter 15 and a new phase-error measurement cycle follows as described in the foregoing until the phase-error detectors stop releasing processable signals and the trigger threshold of monostable flip-flop stages 8 and 9 is no longer attained. From this point on, the most recently stored correction values remain as standards for the new axial displacement of the head wheel. If new malfunctions or misfiring occur during playback, the aforesaid process is repeated from the beginning until the desired final result, unobjectionable playback of the recorded video signal.

FIG. 4 is a simplified flow chart for still or search operation. Once the still-picture mode has been selected, it is determined whether there is a vertical sync pulse on the track being read by head 1. If not, the magnetic tape is advanced until head 1 locates a vertical sync signal pulse. When it does, the capstan shaft is brought to a stop and the ramp-or-sawtooth signal is applied.

The head wheel reads about 16 to 20 successive tracks while being advanced along the stationary tape by the electromagnetic converter at a constant speed for about 32 msec (20 tracks per 1.6 msec). Flyback to the stored starting position takes about 3 to 5 track durations of 1.6 msec each, and the video signal must be scanned out during this time.

During search, the tape speed must be determined and the speed V at which the head wheel is being accelerated or decelerated added thereto, meaning that the slope of the sawtooth signal must be modified by the value of tape speed.

Figure 5:
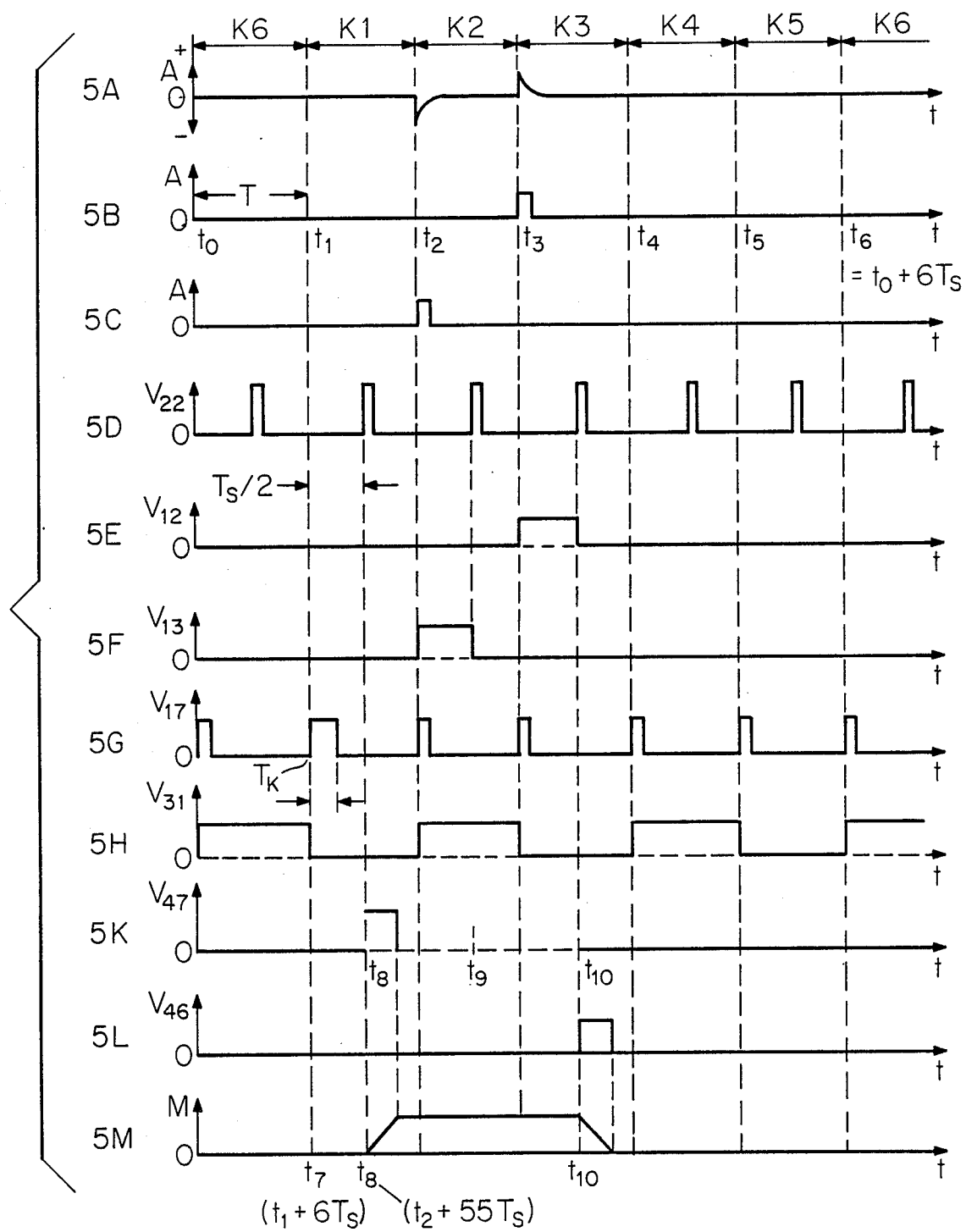

FIG. 5 provides an overview of time graphs and signal forms from the block diagram in FIG. 2.

FIG. 5A shows the signal form of the voltage at the output of initial time element 3A, which, because of the azimuthal displacement, can indicate different directions for identical track errors. When second head K2 comes into action, a negative phase jump is displayed, whereas a positive phase jump can be detected for head K3. The time between the last line sync pulse read by head 1 and the first line sync pulse read by head 2 can for example be about 62 $\mu$sec. During the transition from head 2 to head 3 there is a positive phase error that corresponds for example to a time of 66 $\mu$sec. FIGS. 5B and 5C show the pulses supplied by polarity separation-and-limitation stage 6 or 7 and arriving at the triggering outputs T of monostable flip-flop stages 8 and 9. FIG. 5D shows the resetting pulses that output 22 of detector-counter 19 supplies to the resetting inputs R of flip-flop stages 8 and 9 in order to reset them again before the heads are shifted. They are displaced half a track duration in relation to the pulses supplied by the head-wheel pulse generator.

FIGS. 5E and 5F accordingly show pulses at the input of incorrect-direction detection stage 33 that indicate phase errors, with 5E representing a positive and 5F a negative phase error. The pulses have the same amplitude at an equal pulse duration, which corresponds to half (800 $\mu$sec) a track duration (TS=25H=1600 $\mu$sec).

FIG. 5G shows the series of pulses supplied to the input 17 of circuit 11 by the head-drum pulse generator, with a pulse I that is coded in its width ($T_K$) being supplied when the first head (K1) is in contact with the tape.

FIG. 5H shows the rectangular head-shifting control signal ($V_{31}$) emitted by bistable flip-flop switch 30 and supplied for correlation to incorrect-direction detection stage 33 at input 32.

FIGS. 5K and 5L show the output signals from output memory 41 that appear at output 47 or 46 and are employed to control the two switches 48 and 49. Since these signals V 47 or V 48 are delayed 5.5 track durations in relation to the phase-error pulses at output A of the PLL by memory system 39, correction is interrupted during the following head rotation. FIG. 5M shows the correction pulse subsequent to integration in integration circuit 16.

What is claimed is:

1. A track readjustment arrangement for a video magnetic tape recorder with magnetic tape having motion in a predetermined direction; at least two magnetic heads traveling across said motion direction for scanning transversely signals recorded on said magnetic tape; a rotatable head wheel carrying said magnetic heads and having a central axis; said magnetic heads having air gaps with an azimuth angle alternating mirror-inverted around said central axis; said signals scanned by said magnetic heads may have phase errors of horizontal sync pulses, said phase errors having magnitude and direction; each of said magnetic heads providing control parameters derived from the magnitude and direction of said phase errors; and means for selectively axially varying and resetting said head wheel as a function of said control parameters; said means for selectively axially varying and resetting said head wheel comprising a correction circuit; a detection circuit downstream of said correction circuit and having a PLL circuit with input receiving a playback signal, said PLL circuit detecting said phase errors with constantly recurring sequences of pulses with the playback signal; series-connected low-pass filters with a first time constant, said PLL circuit having a second time constant greater than said first time constant, said first time constant ensuring that phase jumps occurring in the horizontal sync signal during head shifting are converted into short-duration pulses at the PLL circuit output, said headwheel with all magnetic heads following recorded magnetic tracks on said tape during still picture reproduction as well as during normal reproduction when said tape moves, said headwheel with said magnetic heads following said recorded magnetic tracks exclusively through said phase errors.

2. A track readjustment arrangement for a video magnetic tape recorder with magnetic tape having motion in a predetermined direction; at least two magnetic heads traveling across said motion direction for scanning transversely signals recorded on said magnetic tape; a rotatable head wheel carrying said magnetic heads and having a central axis; said magnetic heads having air gaps with an azimuth angle alternating mirror-inverted around said central axis; said signals scanned by said magnetic heads may have phase errors of horizontal sync pulses, said phase errors having magnitude and direction; each of said magnetic heads providing control parameters derived from the magnitude and direction of said phase errors; and means for selectively axially varying and resetting said head wheel as a function of said control parameters; said means for selectively axially varying and resetting said head wheel comprising a correction circuit; a detection circuit downstream of said correction circuit and having a PPL circuit with input receiving a playback signal, said PLL circuit detecting said phase errors with constantly recurring sequences of pulses with the playback signal; series-connected low-pass filters with a first time constant, said PLL circuit having a second time constant greater than said first time constant, said first time constant ensuring that phase jumps occurring in the horizontal sync signal during head shifting are converted into short-duration pulses at the PLL circuit output; two polarity-separation stages with parallel-connected inputs connected to said PLL circuit output; said polarity-separation stages having outputs; a monostable flip-flop stage actuated by said outputs of said polarity-separation stages and supplying output pulses of equal amplitude at duration in presence of phase errors.

3. A track readjustment arrangement as defined in claim 2, wherein output pulses from said monostable flip-flop stages have a duration of substantially half a track duration.

4. A track readjustment arrangement for a video magnetic tape recorder with magnetic tape having motion in a predetermined direction; at least two magnetic heads traveling across said motion direction for scanning transversely signals recorded on said magnetic tape; a rotatable head wheel carrying said magnetic heads and having a central axis; said magnetic heads having air gaps with an azimuth angle alternating mirror-inverted around said central axis; said signals scanned by said magnetic heads may have phase errors of horizontal sync pulses, said phase errors having magnitude and direction; each of said magnetic heads providing control parameters derived from the magnitude and direction of said phase errors; and means for selectively axially varying and resetting said head wheel as a function of said control parameters, said headwheel with all magnetic heads following recorded magnetic tracks on said tape during still picture reproduction as well as during normal reproduction when said tapes moves, said headwheel with said magnetic heads following said recorded magnetic tracks exclusively through said phase errors.

5. A track readjustment arrangement as defined in claim 4, wherein said means for selectively axially varying and resetting said head wheel comprises correction circuit; a detection circuit downstream of said correction circuit and having a PLL with input receiving a playback signal, said PLL circuit detecting said phase errors with constantly recurring sequences of pulses from the playback signal.

6. A track readjustment arrangement as defined in claim 4, including electromechanical converter means for axially resetting said rotatable head wheel.

7. A track readjustment arrangement as defined in claim 6, including integration means for supplying said control parameters to said electromechanical converter means for resetting said head wheel.

8. A track readjustment arrangement as defined in claim 6, wherein a sawtooth control parameter is also supplied to said electromechanical converter means when the tape is stationary for still-picture operation.

9. A track readjustment arrangement as defined in claim 6, wherein a sawtooth control parameter is also supplied to said electromechanical converter means when the tape travels at high speed for search operation.

10. A track readjustment arrangement as defined in claim 4, including a pulse generator connected to said head wheel and supplying a pulse when one of said magnetic heads contacts said tape, said pulse differing in duration from durations of pulses from other heads.

11. A track readjustment arrangement as defined in claim 10, including a detector for processing pulses from said pulse generator so that said pulse supplied when said one magnetic head contacts said tape is used as a resetting pulse.

12. A track readjustment arrangement for a video magnetic tape recorder with magnetic tape having motion in a predetermined direction; at least two magnetic heads traveling across said motion direction for scanning signals recorded on said magnetic tape; a rotatable head wheel carrying said magnetic heads and having a central axis; said magnetic heads having air gaps with an azimuth angle alternating mirror-inverted around said central axis; said signals scanned by said magnetic heads may have phase errors of horizontal sync pulses, said pulse errors having magnitude and direction; each of said magnetic heads providing control parameters derived from the magnitude and direction of said phase errors; and means for selectively axially varying and resetting said head wheel as a function of said control parameters; a pulse generator connected to said head wheel and supplying a pulse when one of said magnetic heads contacts said tape, said pulse having a duration differing from durations of pulses from other heads; a detector for processing pulses from said pulse generator so that said pulse supplied when one of said magnetic heads contacts said tape is usable as a resetting pulse; a bistable flip-flop switch circuit with control unit input receiving pulses from said pulse generator and being reset by said pulse supplied when one of said magnetic heads contacts said tape; an incorrect-direction detection stage connected to said bistable flip-flop switch circuit, said means for selectively axially varying and resetting said head wheel comprising a correction circuit; said flip-flop switch having an output with rectangular pulses functioning as a control signal at the correction circuit output to correlate polarity of pulses from phase errors with azimuth angles of the individual magnetic heads in said incorrect-direction detection stage.

13. A track readjustment arrangement as defined in claim 12, including a detector-counter for converting pulses from said pulse generator into a series of pulses delayed half a track period; a monostable flip-flop stage supplying output pulses of equal amplitude and duration in presence of phase errors and having resetting inputs receiving said series of pulses delayed half a track period.

14. A track readjustment arrangement as defined in claim 13, including two ring counters associated with said detector-counter.

15. A track readjustment arrangement as defined in claim 14, wherein one of said ring counters has a counting input receiving pulses from said pulse generator; and input memory having address inputs connected to parallel outputs of said one ring counter; said other ring counter having a counting input receiving said series of pulses delayed half a track duration; and an output memory with address inputs connected to parallel outputs of said other ring counter.

16. A track readjustment arrangement as defined in claim 15, wherein said input memory has data inputs connected to outputs of said incorrect-direction detection stage; and a controlled data-transfer stage connected between data outputs of said input memory and data outputs of said output memory.

17. A track readjustment arrangement as defined in claim 16, including two series-connected switches positioned between two sources of voltage and having a midpoint, said series-connected switches being controlled by two outputs of said output memory, said two outputs of said output memory being switched to a high state for track errors in opposite direction; an integration circuit having an input connected to said midpoint through a control output of said correction circuit, said midpoint applying correction signals to said converter means.

18. A track readjustment arrangement as defined in claim 17, including circuit means for combining signals from said midpoint with sawtooth signals.

* * * * *